Patented Sept. 28, 1937

2,093,990

UNITED STATES PATENT OFFICE 2,093,990

IMPROVEMENT IN THE MANUFACTURE OF POLYNAPHTHYL ALKYLENE ETHERS

Harold G. Bowlus, Penns Grove, N. J., assignor to E. I. du Pont de Nemours & Company, Wilmington, Del., a corporation of Delaware No Drawing. Application October 24, 1936, Serial No. 107,399

5 Claims. (Cl. 260—150)

This invention relates to the manufacture of organic compounds. More particularly, this invention deals with the production of polynaphthyl alkylene ethers, as typified by ethylene-glycol-di-beta-naphthyl ether.

Ethylene-glycol-di-beta-naphthyl ether has been prepared by Koelle (Ber. 13, 1954) by reacting ethylene bromide, beta-naphthol and caustic soda in alcoholic solution.

In U. S. P. 1,979,144, Dahlen, Black and Foohey proposed to prepare compounds of this general type by reacting an alkyl dihalide and sodium naphtholate in aqueous solution in a closed vessel.

My present invention is in the nature of an improvement over U. S. P. 1,979,144.

It is an object of this invention to improve the process of Dahlen, Black and Foohey by modifying the procedure so as to increase the yield of the desired di-naphthyl-alkylene ether based on the original quantity of beta-naphtholate employed. Other and further objects of this invention will appear as the description proceeds.

According to the preferred procedure of Dahlen, Black and Foohey, the initial material is reacted in substantially theoretical proportions, that is 2 mols of sodium naphtholate to 1 mol. of 1,2-dichloroethane, for instance. The yield of ethylene-glycol-di-beta-naphthyl ether is, nevertheless, only about 56% of theory. Also, about 30% of the original beta-naphthol may be recovered from the filtrates.

It is known in the case of many reactions, involving compounds in solution, that the yield of reaction product may be increased by increasing the initial proportion of one of the reactants. In the present case, however, increasing the initial quantity of dichloroethane is not feasible, because it would increase the tendency to form a mono ether; namely, beta-naphthyl-beta-chloroethyl ether. In any event, I have found by actual trial that increasing the initial quantity of dichloroethane does not result in an increased yield of the di-beta-naphthyl-ethylene ether. Evidently then, the low yield is not due to equilibrium troubles.

I have, therefore, investigated the above process more fully, and found that the low yield of the desired reaction product is due to various side reactions which result in decomposition of part of the initial alkylene halide. Thus, sodium naphtholate in aqueous solution ionizes, or perhaps reversibly hydrolyzes partly to liberate free NaOH. The OH ions or free NaOH thus formed attacks the dichloroethane, causing the following side reactions to occur:

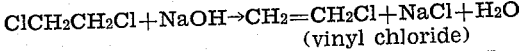
(vinyl chloride)

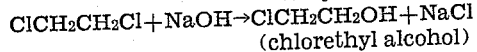
(chlorethyl alcohol)

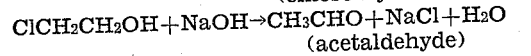
(acetaldehyde)

As the NaOH is consumed in these side reactions, further quantities of the sodium-naphtholate ionize or hydrolyze, liberating further quantities of free sodium hydroxide, and the cycle repeats itself. The net effect is not only a loss of alkylene dichloride, but also the conversion of part of the naphtholate into the form of free naphthol, which is non-reactive for the purposes of the reaction under consideration.

Now, according to my invention, the above losses of alkali and alkylene-halide are compensated for by introducing into the reaction mass further quantities of these materials at a convenient point in the procedure, after the reaction has progressed for some time.

According to my invention, I initiate the reaction substantially in the same manner, with the same proportions of initial materials and the same temperature ranges, as disclosed by Dahlen, Black and Foohey. But after the reaction has proceeded in the closed vessel for some time, say 2 to 8 hours, additional quantities of alkali and the respective alkylene halide are introduced, and the reaction continued as before for a suitable length of time, say 2 to 8 hours. The reaction vessel is then opened and treated further as in U. S. P. 1,979,144 to separate the reaction product from unreacted initial material, and to recover in the form of beta-naphthol the unreacted remaining quantities of the naphtholate.

The quantities of added alkali and alkylene-halide may vary, say from 10% to 40% by weight of the respective quantities initially started with (that is, 0.20 to 0.80 mol. of the alkali and 0.10 to 0.40 mol. of the alkylene halide per mol of initial alkylene halide), and in each case the conversion yield of dinaphthyl-alkylene ether will be found larger than without this addition.

If desired, a third addition may be made after the second period of the reaction has run for some time. But from economic considerations it will be best to omit the third step in most cases.

The following example, in which parts by weight are given, will serve to illustrate my preferred mode of operation without any intent to limit my invention thereto. In particular it will be understood that although I selected below the reaction of sodium-beta-naphtholate and 1,2-dichloroethane for the purpose of specific illustration, my improvement is applicable to any of the reactions set forth in the specific examples and subsequent general discussion of said U. S. P. 1,979,144.

Example

Into an agitated iron autoclave charge 100 parts of beta-naphthol, 92.8 parts of 30% liquid caustic soda, and 39.7 parts of water, and stir for 15 minutes at 50–60° C. Add 34.6 parts ethylene dichloride, close the autoclave, and heat at 120–130° C. for 3 hours. Without opening the autoclave or cooling the charge, add from an equalizing tank or proportioning pump 15.7 parts of 30% liquid caustic soda and 8.6 parts of ethylene dichloride, and heat again for 3 hours at 120–130° C. Cool the charge to 80–90° C., open the autoclave, add 30% caustic soda until an alkaline reaction on Clayton yellow paper is obtained, (which test represents a pH value of approximately 11.0), and then filter off the insoluble ethylene glycol di-beta-naphthyl ether. A yield of crude material containing approximately 70 parts of pure ethylene glycol di-beta-naphthyl ether is obtained. On acidifying the filtrate, approximately 20 parts of crude beta-naphthol are obtained.

It is clear that instead of 30% liquid caustic soda, a solution of 96% caustic soda or any other concentration in water can be used. The temperature at which the charge is heated may be varied from 90°–150° C., although preferably at 120°–130° C. At the higher temperatures the time of heating is reduced, but stronger apparatus is necessary to withstand the higher pressure which is developed. The time of heating the charge may be varied from 2 to 8 hours, depending upon the temperature of heating. Good agitation is a very important item. It is possible to make a third addition of liquid caustic soda and ethylene dichloride followed by a third heating period, but the increase in the conversion yield is not sufficiently large to economically warrant the additional expenditure of reactants and time.

This process can be applied to the reaction between sodium alpha or beta-naphtholate and any of the alkyl halides mentioned in U. S. P. 1,979,144—ethylene dibromide, beta-beta'-dichlordiethyl ether, 1,2-dichloro-propane, trimethylene bromide, gamma-gamma'-dichlorodipropyl ether, etc.

This invention has the advantages over U. S. P. 1,979,144 of giving a higher yield of product and a smaller recovery of naphthol. For instance, Example I of U. S. P. 1,979,144 claims a yield of ethylene glycol di-betanaphthyl ether of 56% and a recovery of unused crude beta-naphthol of 30%, while the present invention will give a yield of 64% of ethylene glycol di-betanaphthyl ether and a recovery of unused crude beta-naphthol of only 20%.

It will be understood that my invention is susceptible of considerable variation and modification, without departing from the spirit thereof.

I claim:

1. In the process of manufacturing a poly-naphthyl-alkylene ether by reacting a metal naphtholate with an alkylene halide in aqueous solution, the improvement which comprises adding to the reaction mass, after the initial reaction period, a further quantity of the alkylene halide and a quantity of aqueous alkali, and continuing the reaction.

2. In the process of manufacturing a poly-naphthyl-alkylene ether by reacting together an alkali-metal naphtholate and an alkylene halide in aqueous medium, the improvement which comprises heating the reacting materials in a closed vessel at a temperature between 90° and 150° C. for several hours, then introducing into the reaction mass aqueous alkali and a further quantity of the alkylene halide, and continuing the heating until reaction is substantially complete.

3. The process which comprises heating together substantially 2 molal ratios of a metal naphtholate with substantially 1 molal ratio of a di-alkylene halide in aqueous medium and under autogenous pressure for a period of time between 2 and 8 hours, then introducing a quantity of an aqueous alkali corresponding to about 0.20 to 0.80 molal ratios, and a further quantity of the dialkylene halide corresponding to between 0.10 and 0.40 molal ratios, continuing the heating under autogenous pressure for another period between 2 and 8 hours, and recovering di-naphthyl-alkylene ether from the reaction mass.

4. The process of producing di-beta-naphthyl ether of ethylene glycol which comprises heating together at a temperature between 120° and 130° C. in aqueous medium and in a closed vessel, a mixture of about 2 mols of sodium-beta-naphtholate and about 1 mol. of dichloroethane, then, after the decomposition of the sodium-beta-naphtholate, introducing further from 0.10 to 0.40 mol. of dichloroethane and from 0.20 to 0.80 mol. of aqueous sodium hydroxide, continuing the heating until reaction is substantially complete, and recovering di-beta-naphthyl of ethylene glycol from the reaction mass.

5. The process which comprises heating in an autoclave at a temperature of 120° to 130° C. in an aqueous medium, about 35 parts by weight of ethylene-dichloride with the sodium salt obtained from about 100 parts of beta-naphthol, for a period of about 3 hours; then adding further about 9 parts of ethylene dichloride and a quantity of caustic soda solution corresponding to about 16 parts of a 30% solution, heating the mass at 120° to 130° C. for about another 3 hours; releasing the pressure, adding further alkali until the reaction mass has a pH value of approximately 11.0, and recovering the precipitated di-beta-naphthyl-ether of ethylene glycol.

HAROLD G. BOWLUS.